United States Patent Office 2,898,350
Patented Aug. 4, 1959

2,898,350
OZONOLYSIS OF COAL-TAR PRODUCTS

Murray G. Sturrock and Edwin L. Cline, Pittsburgh, and Kenneth R. Robinson, Pitcairn, Pa., assignors to Koppers Company, Inc., a corporation of Delaware No Drawing. Application December 11, 1958
Serial No. 779,529

10 Claims. (Cl. 260—385)

This invention pertains to the ozonolysis of anthracene-phenanthrene mixtures, the products of which may be readily isolated.

That fraction of coal tar creosote which boils in the vicinity of 340° C. at atmospheric pressure contains substantial quantities of anthracene and phenanthrene, which are present in the proportion of about one part of the former to four parts of the latter. Phenanthrene occurs in coal tar to the extent of three percent to five percent and is separated in the pure state from coal tar creosote only with great difficulty. The boiling points of anthracene and phenanthrene are sufficiently close together to make separation by fractional distillation infeasible. The two hydrocarbons form a continuous series of solid solutions and while separation of technically pure anthracene is theoretically possible from this system by crystallization techniques the operation is tedious and expensive.

Phenanthrene was first treated with ozone by Harries and Weiss (Annalen 343, 373) in 1907 but no further work on this is reported in the literature until 1955 when Schmitt, Moriconi, and O'Conner (JACS 77, 5640) ozonized phenanthrene in acetic acid and in chloroform. In order to obtain yields of the order of 50% diphenaldehyde they were obliged to reduce catalytically with hydrogen or permit the ozonation product to stand for a period of days in contact with large volumes of water. Bailey a year later (JACS 78, 3811) ozonized phenanthrene in methyl alcohol and obtained a sixty-five percent yield of diphenaldehydic acid. Roitt and Watters (J. Chem. Society 3060) and Bailey (J. Org. Chem. 22, 98) have ozonized anthracene in acetic anhydride and acetic acid respectively but to obtain substantial yields additional treatment of the ozonation product with reducing agents was necessary. It may be concluded that some work has been done in ozonizing anthracene and phenanthrene separately, but the literature contains no reference to the treatment of anthracene-phenanthrene mixtures with ozone.

It is an object of the invention to treat anthracene-phenanthrene mixtures with ozone to yield useful anthracene and phenanthrene derivatives concurrently, which are readily separated from each other.

Another object of the invention is the production of any desired member of a series of ortho, ortho' diphenyl derivatives together with anthraquinone by ozonation of anthracene-phenanthrene mixtures.

Another object is to increase the yield of anthraquinone beyond that heretofore obtainable from anthracene directly by ozonolysis.

We have found an economical means of treating anthracene-phenanthrene mixtures readily obtainable from coal tar creosote by which the anthracene is converted essentially to anthraquinone and the phenanthrene essentially to any desired member of a series of ortho, ortho' diphenyl derivatives. The products from phenanthrene can be readily separated from anthraquinone either by use of their acidic nature or by use of their markedly higher solubility in most solvents.

According to our invention we take an anthracene-phenanthrene mixture obtained from creosote or other sources and suspend it in a mixture of water and a solubilizing agent for the hydrocarbon mixture and the ozone, such as an aliphatic alcohol, followed by the addition of measured amounts of ozone contained in a stream of air or oxygen. Ozonation takes place at room temperature after which the mixture is distilled at atmospheric pressure to remove the alcohol as such or as an alcohol-water azeotrope. Heating the reaction mixture serves not only to distill off the alcohol but also to promote the hydrolysis of the ozonation product in the solution. Upon cooling anthraquinone, the principal product from anthracene, is removed by filtration.

When ozonation conditions are so arranged, as hereinafter defined, that the principal product from phenanthrene is diphenaldehyde, concurrent hydrolysis of the ozonation product and the removal of the alcohol is not essential. When employing these conditions the ozonation product preferably is either filtered directly or it is refluxed to effect hydrolysis, cooled and filtered prior to removal of the alcohol. The anthraquinone is recovered as the precipitate, and the diphenaldehyde remains in the solution. The alcohol is then removed by distillation and the diphenaldehyde is precipitated on cooling and is recovered in a second filtration. Acidification of the filtrate is necessary to precipitate any of the other members of the series of ortho, ortho' diphenyl derivatives of phenanthrene when an alkaline hydrolysis is used. This series of phenanthrene derivatives is described below in order of oxidation state.

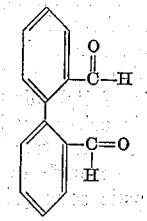

Ortho, ortho' diformyl diphenyl or diphenaldehyde

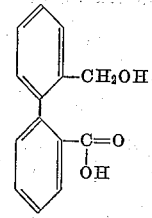

Ortho-hydroxy-methyl-ortho'-carboxy diphenyl

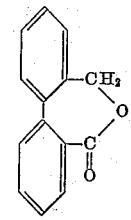

Internal ester of ortho-hydroxy-methyl-ortho'-carboxy diphenyl

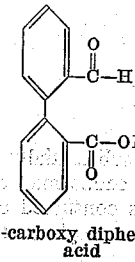

Ortho-formyl-ortho'-carboxy diphenyl or diphenaldehydic acid

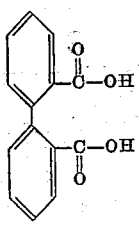

Ortho-ortho' dicarboxy diphenyl or diphenic acid

The particular phenanthrene derivative produced is determined by the reaction conditions including the amount of ozone added, the reaction medium, and the pH of the hydrolysis reaction. It has been found that temperature and the concentration of the ozone in the ranges of variables ordinarily obtainable are subordinate to the conditions of hydrolysis and the nature of the reaction medium. For example, the variation of temperature over the range −20° C to +80° C. and of ozone concentration over the range two percent to eight percent by weight in the gas stream have relatively little effect on the yield and nature of the products.

With the exception of diphenaldehyde all of the above compounds can be oxidized with nitric acid to diphenic acid in substantially quantitative yields. Diphenaldehyde is surprisingly resistant to oxidation. It is not attacked by hydrogen peroxide and other mild oxidizing agents usually employed for converting aromatic aldehydes to the corresponding acids. We have been able to obtain, most unexpectedly, 9-10 phenanthraquinone by oxidation of diphenaldehyde. When nitric acid is used as an oxidizing agent about equal parts of 9-10 phenanthraquinone and diphenic acid are quantitatively produced. When moist chlorine is used, substantially quantitative conversion to 9-10 phenanthraquinone is obtained. Ozonized air may be used to oxidize diphenaldehydic acid to obtain a fifty-four percent yield of diphenic acid.

The yield of diphenic acid may be increased by the addition of an excess of the stoichiometric amount of thirty percent hydrogen peroxide to the ozonation product along with the caustic soda prior to the hydrolysis and distillation.

The ozonolysis is carried on at room or slightly elevated temperatures with substantially complete consumption of the ozone. The ozone may be carried in an air or oxygen stream and is consumed on the basis of one mole of ozone per mole of phenanthrene, three moles of ozone per mole of anthracene, and slightly less than one mole per mole of unidentified compounds assuming they have the same molecular weight as anthracene.

Heretofore various anhydrous organic liquid reaction media have been used. We have found that we can obtain unexpectedly improved results by using as the reaction medium a mixture of water and an aliphatic alcohol. The use of water results in higher yields of both anthraquinone and either of two phenanthrene derivatives, namely ortho-ortho' diformyl diphenyl or ortho-hydroxy - methyl-ortho'-carboxyl - diphenyl. These compounds are formed in comparatively small amounts where no water is present. Thus, for purposes of the invention, water serves as the primary component in the reaction medium. The presence of the alcohol is necessary only to the extent that it serves as a solubilizing agent for the hydrocarbons and the ozone. The weight ratio of water to alcohol in the reaction medium is, therefore, critical and should range between about 12 parts water:88 parts alcohol and about 80 parts water:20 parts alcohol. The reaction medium must comprise at least about 12% by weight water to eliminate the substantial tar formation that occurs when ozonation is conducted in the presence of absolute alcohols. The rate of ozone absorption becomes very low when water alone is used as a medium, because of the low solubility of the hydrocarbon therein. The reaction medium must, therefore, contain about 20% by weight alcohol.

Aliphatic alcohols having to eight carbon atoms per molecule are suitable as reaction media in our process. It has been found that tertiary butyl alcohol is the most desirable of the alcohols; it exhibits high product yields and suffers less from ozone attack than, for example, methyl alcohol. Further, tertiary butyl alcohol is one of those alcohols which are miscible with water in all proportions, which form an azeotrope with water containing a high percentage of alcohol and which boil sufficiently below water to permit easy separation by distillation. However, this is not to exclude the advantages of both methyl and ethyl alcohols. The following table illustrates the influence of methyl, ethyl, and tertiary butyl alcohols on the yields of the various products as well as the influence of water in the alcohol on the products:

TABLE

Ozonation of phenanthrene-anthracene mixtures

| Name | Alcohol, Percent | Water, Percent | Percent Anthracene Recovered as Anthraquinone | Percent Phenanthrene Recovered as— | | |
|---|---|---|---|---|---|---|
| | | | | Diphenic Acid | Diphenaldehydic Acid | O-Hydroxy Methyl O'-Carboxy Diphenyl |
| Tertiary Butyl Alcohol | 100 | 0 | 20.9 | (*) | (*) | (*) |
| Do | 88 | 12 | 34.0 | 12.5 | 10.5 | 71.7 |
| Do | 88 | 12 | 29.5 | 11.7 | 9.8 | 66.5 |
| Do | 50 | 50 | 55.4 | 0 | 10.4 | 83.5 |
| Do | 40 | 60 | 61.7 | 0.8 | 6.2 | 72.6 |
| Do | 30 | 70 | 71.5 | 0 | 4.6 | 70.9 |
| Do | 20 | 80 | 53.5 | 0 | 3.8 | 46.4 |
| Do | 10 | 90 | 18.4 | 0 | 5.8 | 13.6 |
| Methyl Alcohol | 100 | 0 | 33.2 | 3.9 | 70.0 | 0.1 |
| Do | 88 | 12 | 44.5 | 5.0 | 47.0 | 3.5 |
| Do | 75 | 25 | 55.3 | 5.8 | 43.7 | 18.5 |
| Do | 50 | 50 | 31.9 | 3.8 | 22.0 | 26.9 |
| Ethyl Alcohol | 100 | 0 | 38.4 | 5.4 | 33.3 | 40.7 |
| Do | 100 | 0 | 26.9 | 4.2 | 43.2 | 28.8 |
| Do | 75 | 25 | 54.0 | 0 | 20.6 | 58.3 |
| Do | 50 | 50 | 50.5 | 6.8 | 14.5 | 50.2 |

*Tar formation prevented a determination of the phenanthrene derivatives, but corresponding values based on yields obtained by ozonation of phenanthrene alone in 100% tertiary butyl alcohol indicate a distribution as follows: 12.5% diphenic acid; 63.4% diphenaldehydic acid; and 21.1% ortho-hydroxy-methyl-ortho'-carboxy diphenyl.

As we have already noted, through the use of the water-alcohol medium the yield of anthraquinone is markedly improved and tar formation is reduced to a point where it no longer interferes in the recovery of the acidic products from phenanthrene. In the case of tertiary butyl alcohol a twelve percent water content is a practical lower limit, since this is the azeotropic composition. This ratio is most economical since the azeotrope as recovered from distillation of one ozonolysis reaction may be used in subsequent reactions without altering the ratio of alcohol to water. It is not to be denied, however, that a fifty-fifty ratio of tertiary butyl alcohol to water gives the better yields of anthraquinone and ortho-hydroxy-methyl-ortho'-carboxy diphenyl. Methyl alcohol alone gives low yields of anthraquinone, the balance of the anthracene being converted to an intractable tar. The addition of water to the alcohol substantially eliminates the tar formation which is important with respect to the purification of the products.

It will be noted from the table that the composition of the product from phenanthrene may be regulated by selecting the alcohol as well as by varying the quantity of water present with it in the ozonation step. Qualitatively, the effect of water is the same with all of the alcohols in that it increases production of the derivatives in the lowest state of oxidation of the series at the expense of products in the higher states of oxidation. Quantitatively the extent of the effect of water varies with the alcohol used.

We have found that the pH of the hydrolysis solution determines the identity of the principal product derived from phenanthrene where alcohol-water mixtures are used as the reaction medium. To demonstrate this, sodium carbonate, a weak base, was added to an ozonation reaction mixture containing the tertiary butyl alcohol-water azeotrope followed by simultaneous hydrolysis and distillation to remove the alcohol-water azeotrope. Upon cooling diphenaldehyde was recovered in about eighty-one percent yield. If no base is added to the mixture containing the ozonation products, hydrolysis occurs under neutral to mildly acidic conditions during distillation. Using a reaction medium comprising 40% by weight tertiary butyl alcohol and 60% by weight water for ozonation and no additive to change the pH of hydrolysis, a 98.5% yield of diphenaldehyde, based on the phenanthrene charged, was obtained. In another reaction sodium hydroxide, a strong base, was added to an ozonized tertiary butyl alcohol-water reaction mixture. A seventy-eight percent yield of ortho-hydroxy-methyl-ortho'-carboxy diphenyl was recovered. It may be seen from this that diphenaldehyde is the principal product where no base or a weak base is used, while a strong base gives a principal product of ortho-hydroxy-methyl-ortho'-carboxy diphenyl. The principal product derived from phenanthrene where tertiary butyl alcohol is used without water is diphenaldehydic acid irrespective of whether the hydroylsis is conducted in the presence of sodium carbonate or sodium hydroxide.

The following examples illustrate the procedure used in carrying out our novel method for the ozonolysis of anthracene-phenanthrene mixtures:

EXAMPLE 1.—OZONATION OF AN ANTHRACENE-PHENANTHRENE MIXTURE IN TERTIARY BUTYL ALCOHOL (88%)–WATER (12%)

12 parts of phenanthrene (0.067 mole) and 3 parts of anthracene (0.017 mole) were slurried with 109 parts of tertiary butyl alcohol and 15 parts of water and treated with ozonized air containing 3.94% ozone until a total of 5,664 parts of ozone had been absorbed. Ozonation was conducted at room temperature at a gas flow rate of 0.730 part per minute.

150 parts of 5% sodium hydroxide were added to the reaction mixture which was then distilled at atmospheric pressure and the tertiary butyl alcohol was removed as the azeotrope to the extent of 95% of that used initially. The hydrolysis product was cooled to room temperature and the caustic insoluble material removed by filtration. Analysis showed a 29.5% yield of anthraquinone.

The alkaline solution was acidified with mineral acid and the precipitate recovered by filtration. The precipitate contained chiefly ortho-hydroxy-methyl-ortho'-carboxy diphenyl with smaller amounts of diphenic acid and diphenaldehydic acid.

EXAMPLE 2.—OZONATION OF AN ANTHRACENE-PHENANTHRENE MIXTURE IN TERTIARY BUTYL ALCOHOL (50%)–WATER (50%)

The same procedure was used as in Example 1 with yields as shown in the Table.

EXAMPLE 3.—OZONATION OF AN ANTHRACENE-PHENANTHRENE MIXTURE IN METHYL ALCOHOL (75%)–WATER (25%)

The procedure outlined in Example 1 was followed except that the methyl alcohol was removed as such rather than as the azeotrope. The major products were anthraquinone and diphenaldehydic acid with smaller amounts of diphenic acid and ortho-hydroxy-methyl-ortho'-carboxy diphenyl.

EXAMPLE 4.—HYDROLYSIS IN SODIUM CARBONATE SOLUTION

A mixture of 12 parts of phenanthrene and 3 parts of anthracene was suspended in a solution of 50 parts tertiary butyl alcohol and 50 parts water. Ozonation was carried out as in Example 1. At the completion of ozonation 150 parts of 5% sodium carbonate solution were added and hydrolysis effected by refluxing for 30 minutes. Anthraquinone, which was recovered by filtration after cooling, amounted to 59% of the theoretical. The filtrate was distilled at atmospheric pressure to remove tertiary butyl alcohol as the azetrope. Diphenaldehyde was separated from the cooled solution by filtration. The yield was 81.5% of the theoretical.

EXAMPLE 5.—OZONATION OF AN ANTHRACENE-PHENANTHRENE MIXTURE CONTAINED IN A DISTILLATION FRACTION RECOVERED FROM COAL TAR CREOSOTE

The starting material used was a mixture of anthracene and phenanthrene prepared from crude coal tar creosote by fractional distillation. Spectroscopic analysis indicated that the fraction used was composed of 15% anthracene, 65% phenanthrene, and 0.2% carbazole, the balance being unidentified. 10 parts of this material were slurried in a solution of 70 parts of tertiary butyl alcohol and 70 parts of water and treated with ozonized air as in Example 1. The amount of ozone introduced was based upon 1 molar equivalent for phenanthrene, 3 molar equivalents for anthracene and 1 molar equivalent for the unidentified material assigning to the latter the molecular weight of anthracene and phenanthrene. The yield of anthraquinone was 69.5% of the theoretical based on the anthracene contained in the charge. The yield of ortho-hydroxy-methyl-ortho'-carboxy diphenyl was 85.8% and the yield of diphenaldehydic acid was 5.5%, both values based upon the phenanthrene contained in the charge.

EXAMPLE 6.—OZONATION OF AN ANTHRACENE-PHENANTHRENE MIXTURE IN TERTIARY BUTYL ALCOHOL (40%) AND WATER (60%)

Sixteen parts of phenanthrene (0.09 mole) and four parts of anthracene (0.0225 mole) were slurried in 80 parts of tertiary butyl alcohol and 120 parts of water. Oxygen containing 5.14 parts by weight of ozone was passed in at the rate of 2.40 parts per minute until 8.3 parts of ozone had been absorbed. This is equivalent to 1.1 moles of ozone based on the phenanthrene and 3.3 moles of ozone based on the anthracene in the charge. The ozonation was carried out at room temperature. After ozonation the reaction mixture was filtered and washed with 40 parts of the 40% by weight aqueous solution of tertiary butyl alcohol. The yellow precipitate was dried. 2.7 parts were recovered and found to contain 89.2% anthraquinone. The balance was unreacted hydrocarbon. The filtrate was distilled and the tertiary butyl alcohol was recovered as its azeotrope with water. 95% of the alcohol charged was thus recovered.

The distillation residue separated into two liquid phases. The upper aqueous layer was separated and an aliquot portion was treated with excess acidified potassium iodide, and the iodine liberated titrated with sodium thiosulphate solution. In this manner the aqueous solution was found to contain a total of 2.2 parts of hydrogen peroxide equivalent to 0.065 mole or 72% of theory based on the phenanthrene charged. The lower layer, which had solidified to a paste, was washed with water and carefully dried. 18.9 parts of material identified by infra red spectroscopy as diphenaldehyde was thus recovered. Anthraquinone assay by the oxanthrol procedure showed that the product contained 2% anthraquinone. This is equivalent to a yield of 98.0% diphenaldehyde calculated on the bases of the phenanthrene charged. The anthraquinone yield was 59.6% of theory based on the anthracene charged.

This application is a continuation-in-part of our copending application Serial No. 682,593, filed September 9, 1957, and now abandoned.

We claim:

1. Method of making oxidation products of anthracene and phenanthrene and recovering, as separate products, anthraquinone and at least one ortho, ortho' diphenyl derivative from phenanthrene selected from the group consisting of diphenaldehyde, o-hydroxymethyl-o'-carboxydiphenyl, diphenaldehydic acid and diphenic acid comprising passing an azone containing gas stream into a mixture of anthracene and phenanthrene dispersed in a medium consisting of from about 12 to 80% by weight water and about 20 to 88% by weight of an aliphatic alcohol having up to eight carbon atoms to form ozonation products, subjecting said ozonation products to hydrolysis by heating the reaction mixture, and recovering therefrom anthraquinone and at least one of said ortho, ortho' diphenyl derivatives from phenanthrene.

2. Method according to claim 1 wherein anthraquinone is recovered by filtration after the hydrolysis of said ozonation products and before the removal of said alcohol from said reaction mixture and at least one of said ortho, ortho' diphenyl derivatives from phenanthrene is recovered by filtration after removal of said alcohol.

3. Method according to claim 2 wherein hydrolysis is effected in the presence of an alkali metal carbonate and diphenaldehyde is recovered as the principle ortho, ortho' derivative from phenanthrene.

4. Method of making oxidation products of anthracene and phenanthrene and recovering, as separate products, anthraquinone and at least one ortho, ortho' diphenyl derivative from phenanthrene selected from the group consisting of diphenaldehyde, o-hydroxymethyl-o'-carboxy diphenyl, diphenaldehydic acid and diphenic acid comprising passing at least a stoichiometric quantity of ozone into a coal tar fraction consisting primarily of a mixture of anthracene and phenanthrene dispersed in a medium consisting of about 12 to 80% by weight water and about 20 to 88% by weight of an aliphatic alcohol having up to 8 carbon atoms to form ozonation products, subjecting said ozonation products to hydrolysis by heating the reaction mixture, concomitantly removing said alcohol from the reaction products by distillation, removing by filtration precipitated anthraquinone from the distillation residue, and adjusting the pH of the filtrate to an acid pH to form a precipitate of at least one of said ortho, ortho' diphenyl derivatives from phenanthrene.

5. Method according to claim 4 wherein hydrolysis is effected in the presence of an alkaline reacting substance.

6. Method according to claim 5 wherein said alkaline reacting substance is an alkali metal hydroxide and the principal ortho, ortho' diphenyl derivative from phenanthrene recovered is o-hydroxymethyl-o'-carboxydiphenyl.

7. Method according to claim 4 wherein said alcohol is a member selected from the group consisting of methyl, ethyl and tertiary butyl alcohols.

8. Method according to claim 7 wherein said medium consists of 50 to 70% by weight water and 30 to 50% by weight tertiary butyl alcohol.

9. Method according to claim 7 wherein said medium consists of 25% by weight water and 75% by weight methyl alcohol.

10. Method according to claim 7 wherein said medium consists of 25 to 50% by weight water and 75 to 50% by weight ethyl alcohol.

References Cited in the file of this patent

Roitt et al.: J. Chem. Soc. 1949, 3060.
Schmitt et al.: J. Am. Chem. Soc. 77, 5640 (1955).
Bailey: J. Am. Chem. Soc. 78, 3811, Aug. 5, 1956.

UNITED STATES PATENT OFFICE

CERTIFICATE OF CORRECTION

Patent No. 2,898,350                                        August 4, 1959

Murray G. Sturrock et al.

It is hereby certified that error appears in the printed specification of the above numbered patent requiring correction and that the said Letters Patent should read as corrected below.

Column 4, line 29, for "having to" read -- having up to --; column 7, line 32, for "azone" read -- ozone --.

Signed and sealed this 23rd day of February 1960.

(SEAL)
Attest:

KARL H. AXLINE                                         ROBERT C. WATSON
Attesting Officer                                      Commissioner of Patents